US012216052B2

United States Patent
Carr

(10) Patent No.: US 12,216,052 B2
(45) Date of Patent: Feb. 4, 2025

(54) TURBIDITY CALIBRATION-CORRECTION APPARATUS AND METHOD FOR AN AUTOMATED CALIBRATION CORRECTION

(71) Applicant: ABB Schweiz AG, Baden (CH)

(72) Inventor: Benjamin Carr, Gloucestershire (GT)

(73) Assignee: ABB Schweiz AG, Baden (CH)

( * ) Notice: Subject to any disclaimer, the term of this patent is extended or adjusted under 35 U.S.C. 154(b) by 279 days.

(21) Appl. No.: 17/560,957

(22) Filed: Dec. 23, 2021

(65) Prior Publication Data

US 2022/0113252 A1 Apr. 14, 2022

Related U.S. Application Data

(63) Continuation of application No. PCT/EP2020/068054, filed on Jun. 26, 2020.

(30) Foreign Application Priority Data

Jun. 28, 2019 (EP) ..................................... 19183445

(51) Int. Cl.
*G01J 1/10* (2006.01)
*G01N 21/47* (2006.01)
(Continued)

(52) U.S. Cl.
CPC ......... *G01N 21/4785* (2013.01); *G01N 21/49* (2013.01); *G01N 21/53* (2013.01)

(58) Field of Classification Search
CPC ..... G01N 21/4785; G01N 21/49; G01N 21/53
See application file for complete search history.

(56) References Cited

U.S. PATENT DOCUMENTS 5,906,772 A 5/1999 Patterson
7,843,560 B2 * 11/2010 Harner ............... G01N 21/4785
356/442
(Continued)

FOREIGN PATENT DOCUMENTS

CN 102004077 A 4/2011
CN 102362170 A 2/2012
(Continued)

OTHER PUBLICATIONS

European Patent Office, International Search Report in International Patent Application No. PCT/EP2020/068054, 3 pp. (Oct. 2, 2020).
(Continued)

*Primary Examiner* — Lam S Nguyen
(74) *Attorney, Agent, or Firm* — Leydig, Voit & Mayer, Ltd.

(57) ABSTRACT

A turbidity calibration-correction apparatus is configured for an automated calibration-correction of a turbidity. The calibration-correction apparatus includes: a turbidity calibration standard configured for calibration of the turbidity measurement apparatus, a memory configured to store an attribute-value including at least a correction-value that is a function of a turbidity value of the turbidity calibration standard measured by the turbidity measurement apparatus, where the calibration-correction is based on the correction-value, and a communicator configured to transfer at least an identity of the turbidity measurement apparatus and the correction-value from the turbidity measurement apparatus to the calibration-correction apparatus.

12 Claims, 3 Drawing Sheets

(51) Int. Cl.
*G01N 21/49* (2006.01)
*G01N 21/53* (2006.01)

(56) References Cited

U.S. PATENT DOCUMENTS

| | | |
|---|---|---|
| 2008/0114228 A1 | 5/2008 | McCluskey et al. |
| 2010/0235133 A1 | 9/2010 | Palumbo |
| 2012/0144894 A1 | 6/2012 | Trapp et al. |
| 2015/0046125 A1 | 2/2015 | Jagiella et al. |
| 2016/0006928 A1 | 1/2016 | Gibbons et al. |

FOREIGN PATENT DOCUMENTS

| | | | | |
|---|---|---|---|---|
| CN | 103575706 A | | 2/2014 | |
| CN | 104568843 A | | 4/2015 | |
| CN | 105637365 A | | 6/2016 | |
| CN | 106053720 A | * | 10/2016 | ............ G01D 18/00 |
| CN | 109520971 A | | 3/2019 | |
| EP | 0707247 A1 | | 4/1996 | |
| EP | 2413145 A2 | | 2/2012 | |
| EP | 3165902 A1 | | 5/2017 | |
| JP | 2-88944 A | | 3/1990 | |
| JP | 10-332582 A | | 12/1998 | |
| JP | 11-118699 A | | 4/1999 | |
| JP | 2008-64594 A | | 3/2008 | |
| WO | WO 2017/053684 A1 | | 3/2017 | |

OTHER PUBLICATIONS

European Patent Office, Written Opinion in International Patent Application No. PCT/EP2020/068054, 7 pp. (Oct. 2, 2020).
The Patent Office of the People's Republic of China, Office Action in Chinese Patent Application No. 202080047278.8, 10 pp. (Nov. 17, 2023).
European Patent Office, Extended European Search Report in European Application No. 19183445.6, 8 pp. (Nov. 12, 2019).
Cai, "The Design of an IR Turbidimeter Based on Scattering," dissertation, Huazhong Univ. of Science and Tech., 69 pp. (Jan. 16, 2013).
Fan et al., "Calibration of scattered light turbidity meter," *Analytical Instruments*, 4: 35-37 (Nov. 10, 2001).
Kitchener et al., "A review of the principles of turbidity measurement," *Progress in Physical Geography*, 41(5): 33 pp. (Aug. 23, 2017).
Marttila et al., "Calibration of turbidity meter and acoustic doppler velocimetry (Triton-ADV) for sediment types present in drained peatland headwaters: Focus on particulate organic peat," *River Research and Applications*, 26(8): 1019-1035 (Aug. 10, 2009).
Ni, "Design and analysis of an intelligent McFarland turbidimeter," *Equipment Management and Maintenance*, 9: 93-94 (Sep. 6, 2018).
Zhang, "Research and Design of Laser Turbidity Meter," master's thesis, Northeast Petroleum Univ., 70 pp. (Jun. 12, 2010).

* cited by examiner

TURBIDITY CALIBRATION-CORRECTION APPARATUS AND METHOD FOR AN AUTOMATED CALIBRATION CORRECTION

CROSS-REFERENCE TO RELATED APPLICATIONS

This application is a continuation of International Patent Application No. PCT/EP2020/068054, filed on Jun. 26, 2020, which claims priority to European Patent Application No. EP 19183445.6, filed on Jun. 28, 2019. The entire disclosure of both applications is hereby incorporated by reference herein.

FIELD

The present disclosure relates to a turbidity calibration-correction apparatus configured for an automated calibration correction of a turbidity, a method for an automated calibration-correction, a use, a computer program, and a computer-readable storage medium.

BACKGROUND

Turbidity is a measure of cloudiness, haziness, or amount of scattering of a medium. This may be caused by large numbers of individual particles that stray light within the medium. Turbidity may be measured, e.g., in "Formazine Turbidity Units (FTU)" or in "Nephelometric Turbidity Units (NTU)". For a turbidity measurement, an optical turbidity measuring apparatus, which uses a light sensor, is used. At least some types of turbidity measuring apparatuses require regular calibration. When using different calibration standards than Formazine, e.g., a dry standard, there may be a difference in the turbidity values to turbidity values measured by using the Formazine standard. Furthermore, the same dry standard may be measured with a different value on different turbidity measuring apparatuses.

SUMMARY

One or more embodiments of the present disclosure may provide a turbidity calibration-correction apparatus configured for an automated calibration-correction of a turbidity. The calibration-correction apparatus may include: a turbidity calibration standard configured for calibration of the turbidity measurement apparatus; a memory configured to store an attribute-value comprising at least a correction-value that is a function of a turbidity value of the turbidity calibration standard measured by the turbidity measurement apparatus,
  wherein the calibration-correction is based on the correction-value; and a communicator configured to transfer at least an identity of the turbidity measurement apparatus and the correction-value from the turbidity measurement apparatus to the calibration-correction apparatus.

One or more embodiments of the present disclosure may provide a turbidity measurement apparatus. The turbidity measurement apparatus may include a communicator and may be configured to transfer at least an identity of the turbidity measurement apparatus and the correction-value from the turbidity measurement apparatus to a calibration-correction apparatus.

One or more embodiments of the present disclosure may provide a method for an automated calibration-correction of a turbidity of a turbidity measurement apparatus. The method may include: measuring, by means of the turbidity measurement apparatus, a turbidity value of a calibration standard of a calibration-correction apparatus; determining an attribute-value, where the attribute-value comprises at least a correction-value that is a function of the measured turbidity value; storing the attribute-value in a memory of the calibration-correction apparatus; and when calibrating the turbidity measurement apparatus with the calibration standard, reading, by the calibration-correction apparatus, the attribute-value from the memory and performing the calibration-correction based on the attribute-value.

BRIEF DESCRIPTION OF THE SEVERAL VIEWS OF THE DRAWING(S)

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

DETAILED DESCRIPTION OF A PREFERRED EMBODIMENT

Figure 1:
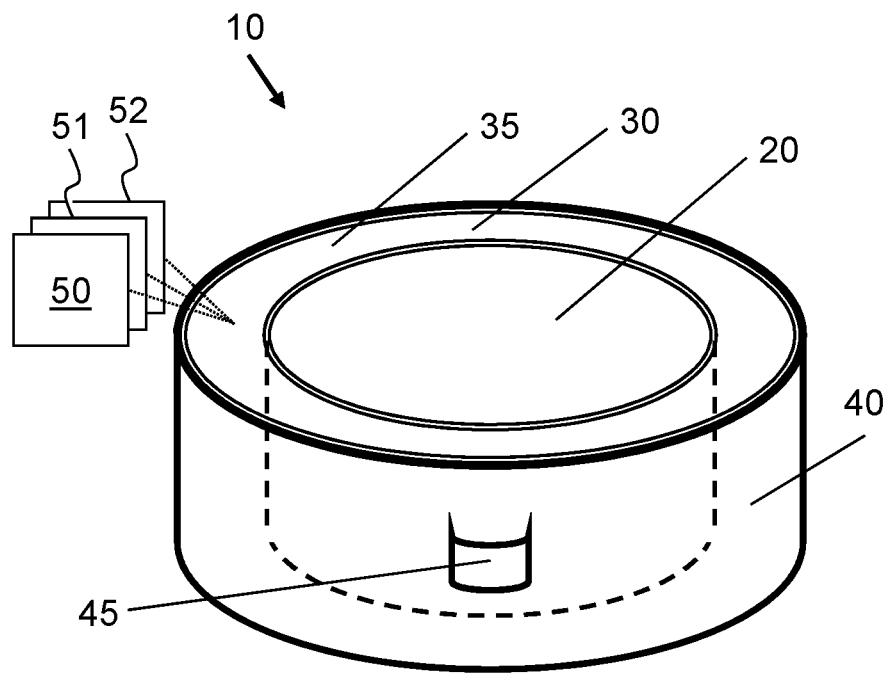
FIG. 1 depicts schematically a turbidity calibration-correction apparatus according to an embodiment.

There may be a desire for an improved quality of a turbidity calibration.

According to a first aspect, a turbidity calibration-correction apparatus configured for an automated calibration-correction of a turbidity comprises:
  a turbidity calibration standard, configured for calibration of the turbidity measurement apparatus;
  a memory, configured to store an attribute-value comprising at least a correction-value that is a function of a turbidity value of the turbidity calibration standard measured by the turbidity measurement apparatus, wherein the calibration-correction is based on the correction-value; and
  a communicator, configured to transfer at least an identity of the turbidity measurement apparatus and the correction-value from the turbidity measurement apparatus to the calibration-correction apparatus.

The turbidity calibration-correction apparatus is an apparatus, which is configured for an automated calibration-correction of a turbidity. The turbidity calibration standard may be a solid, a gel, or a fluid. The turbidity calibration standard may be arranged and/or caged (particularly in case of a gel or a fluid) within an outer contour of the calibration-correction apparatus. The turbidity calibration standard is configured for calibration of the turbidity measurement apparatus. Therefore, when put into a turbidity measurement apparatus, the turbidity calibration standard may be used for measuring and, based on the values measured, used for calibrating the turbidity measurement apparatus. In at least some cases, the values measured this way may differ from turbidity values measured right after manufacturing the turbidity calibration standard and/or the turbidity measurement apparatus. One reason may be, for instance, an optical misalignment of the measurement apparatus and the calibration standard. In different combinations of the measurement apparatus and the calibration standard, the values measured may differ in a different manner. Table 1 shows an example of several measurement results:

TABLE 1

|  | measurement apparatus #1 | measurement apparatus #2 |
|---|---|---|
| calibration-correction apparatus #1 | 101 NTU | 99 NTU |
| calibration-correction apparatus #2 | 100 NTU | 98 NTU |

In the example shown, calibration-correction apparatuses #1 and #2 may be used. Furthermore, a turbidity calibration standard whose nominal turbidity value is 100 NTU (Nephelometric Turbidity Units) is used. The nominal turbidity value is the turbidity value of a calibration-correction apparatus, or of the turbidity calibration standard of this apparatus, which may have been measured right after manufacturing. When measured on measurement apparatus #1, the turbidity value may be 101 NTU and when measured on measurement apparatus #2, the turbidity value of the same calibration standard may be 99 NTU. For a calibration-correction apparatus #2, the turbidity values may be 100 NTU and 98 NTU, respectively.

The turbidity calibration-correction apparatus further comprises a memory, particularly a non-volatile memory. The memory may be, e.g., a flash-memory, an EEPROM, or the like. The memory is configured to store an attribute-value, holding an attribute and/or a set of attributes. The attribute-value comprises at least a calibration-correction value or correction-value, which is a function of a turbidity value of the turbidity calibration standard measured by the turbidity measurement apparatus. The correction-value is used for the turbidity calibration-correction.

The correction-value may be stored in a matrix and/or another data-structure in the memory, e.g., as an attribute or attribute-value of a "combination-value" of the calibration-correction apparatus and the turbidity measurement apparatus. As a data-structure, the attribute-value may be implemented, e.g., as a pointer from the combination-value to a defined area in the memory, which comprises the attribute-value. The combination-value may be of the form <S-id, M-id>, where S-id may be an identity of the calibration-correction apparatus (or a part of it, e.g., an identity of the calibration standard) and M-id may be an identity of the turbidity measurement apparatus. The identities S-id and M-id may comprise a serial number. The combination-value may thus provide clearly defined means to perform an automated calibration correction for a series of turbidity measurement apparatuses.

The turbidity calibration-correction apparatus further comprises a communicator, configured to transfer at least the identity of the turbidity measurement apparatus and the correction-value from the turbidity measurement apparatus to the calibration-correction apparatus. Additionally (or, in some embodiments: instead) of the correction-value, the attribute-value may be transferred, optionally comprising the measured turbidity value.

This turbidity calibration-correction apparatus contributes to simplifying the calibration of a turbidity measurement apparatus. An easy-to-handle apparatus for the calibration correction of a turbidity calibration standard in a series of measurement apparatuses is provided. Moreover, for each combination of standard and measurement device, a (per definition) correct calibration-correction is performed, independent of factors like an individual variation of an optical misalignment, changes in the optical elements, and/or other factors. In addition, the use of a purely fluid calibration standard like Formazine may be avoided, at least for some calibration cases, and a dry standard—with all its benefits, e.g., in handling, time, and effort—may be used instead. This may lead to a reduced effort, e.g., for service and/or maintenance of the turbidity measurement apparatus. As calibration-correction apparatus may now be associated with it a value for its calibration standard, remaining measuring errors may comprise the repeatability with the same probe, caused, e.g., by damages, external events and/or other issues. At least some of the transferability errors may be eliminated, thus improving the performance of the calibration. As a result, a user of this apparatus has only to put the calibration-correction apparatus into the turbidity measurement apparatus; the calibration, including corrections, is then performed automatically.

In various embodiments, the turbidity calibration standard is a solid, a gel, or a fluid. The calibration-correction apparatus may comprise a housing, where the turbidity calibration standard is arranged in. This offers some freedom in the selection of the calibration standard, possibly for a calibration standard that behaves under selected aspects in a more desired way. Besides a solid, with its clear benefits, a gel or a fluid may be caged in the housing, thus leading to an easy handling.

In an embodiment, the turbidity calibration standard is glass-ceramic composite (GCC) of a lithium, silicon, and aluminum (LAS) system, and/or an inorganic, non-porous Lithium Aluminium Silicon oxide glass-ceramic, e.g., ZERODUR® by SCHOTT. Besides its quite even distribution of light-scattering particles, this GCC has a "zero expansion" property against temperature change, leading to a high invariance to temperature change of the calibration standard.

In various embodiments, the attribute-value is a value-pair representing a relation between the turbidity calibration standard and the turbidity measurement apparatus. Each value of the value-pair may comprise one or more "sub-values". The attribute-value may comprise more values than just a pair, for instance a triple, quadruple, etc., of values. This advantageously allows the turbidity calibration standard to have different values for different turbidity measurement apparatus or turbidimeters.

This brings a broad range of benefits. Firstly, providing automatically the relation between the turbidity calibration standard and the turbidity measurement apparatus may liberate a user of the turbidimeter from manually typing in values of the turbidity calibration standard, thus avoiding or at least reducing that error-prone activity.

Furthermore, this may advantageously contribute cope with an effect that at least some solid standards—and/or other materials that are used as the turbidity calibration standard—may give different readings in different turbidimeters. This may be caused by a variation in optical beam properties of the light source, for example a variation in wavelength of light, light power, light beam profile, mechanical tolerances around the assembly of the light source, by a variance in the optical path, e.g., by mechanical variances in the flow cell manufacture, by variances in the detection circuitry, e.g., by different photodiode efficiencies, mechanical variances in manufacture, and/or by other causes. This may result in a significant error when using the solid standard and/or other materials that are used as the turbidity calibration standard. Further details of this approach may be found below.

In various embodiments, the memory and/or the communicator are an integral part of the calibration-correction apparatus. These components may become an integral part by combining the components in a hardly detachable or not-detachable way. This may be achieved, e.g., by a protrusion-notch-combination that may act as a kind of key, to prevent a wrong assembly or an assembly of wrong components. Along with a suitable housing, the calibration-correction apparatus may be perceived as a single, easy-to-handle turbidity calibration apparatus.

In various embodiments, the attribute-value further comprises at least one of:
a serial number, a nominal turbidity value, and a manufacturing date of the calibration standard. And/or, it may comprise at least one of: a serial number, a last-calibration value, a minimum-calibration value, a maximum-calibration value, a last-calibration date, and a correction-data of the measurement apparatus.

Correction-data may comprise, e.g., a slope and offset of a last calibration. These values may contribute to an identification, for a more precise computing of the correction-value, for providing data, e.g., for service and maintenance, for forecasting a maintenance or correction, for informing a user about unexpected variations, which may be a sign of a damage, theft protection, and/or other purposes.

In various embodiments, the communicator supports an RFID-based protocol (RFID: radio-frequency identification), particularly an NFC protocol (NFC: Near Field Communication), a Bluetooth protocol, and/or a proprietary protocol. The communicator may support, additionally or alternatively, further wired and/or wireless transfer protocols to communicate with the turbidity measurement apparatus.

The calibration-correction apparatus may further comprise a power supply of its own, which may be connected to a "loading" power supply via wire, RFID, Qi, and/or other connections.

A further aspect comprises a turbidity measurement apparatus, which comprises a communicator and which is configured to transfer at least an identity of the turbidity measurement apparatus and the correction-value from the turbidity measurement apparatus to a calibration-correction apparatus.

A further aspect comprises a method for an automated calibration-correction of a turbidity of a turbidity measurement apparatus. The method comprises the steps of:
determining an attribute-value, wherein the attribute-value at least comprises a correction-value that is a function of the measured turbidity value;
transferring, by means of a communicator (35), at least an identity of the turbidity measurement apparatus (50, 51, 52) and the correction-value from the turbidity measurement apparatus (50, 51, 52) to the calibration-correction apparatus (10);
storing the attribute-value in a memory (30) of the calibration-correction apparatus (10); and
when calibrating the turbidity measurement apparatus (50, 51, 52) with the calibration standard (20), reading, by the calibration-correction apparatus (10), the attribute-value from the memory (30) and performing the calibration-correction based on the attribute-value.

Measuring, by means of a turbidity measurement apparatus, a turbidity value of the calibration standard of a calibration-correction apparatus.

The calibration standard may have a turbidity value, which has been assigned, e.g., in a measurement right after manufacturing, as its nominal value, for instance measured in NTUs (Nephelometric Turbidity Units). The calibration standard is part of a calibration-correction apparatus. When measuring the turbidity value of the calibration standard on a (different) turbidity measurement apparatus, the turbidity value may be different to its nominal value.

Determining an attribute-value, wherein the attribute-value at least comprises a correction-value that is a function of the measured turbidity value.

The attribute-value may comprise one or more attributes and/or a set of attributes. The attribute-value comprises at least a calibration-correction value, which is a function of the measured turbidity value and is used for the turbidity calibration-correction.

As a data-structure, the attribute-value may be implemented, e.g., as an attribute of a "combination-value", e.g., as a matrix of combination-values, with pointers to a defined area in the memory, which comprises the attribute-value.

Storing the attribute-value in a memory of the calibration-correction apparatus.

The memory may be a part, particularly in integral part, of the calibration-correction apparatus. This may result in a clear—say "housing-based"—assignment of the calibration-correction apparatus to its values, e.g., to the correction-value. This may further ease the handling of the calibration-correction apparatus, possibly along with the turbidity measurement apparatus.

When calibrating the measurement apparatus with the calibration standard, reading the attribute-value from the memory and performing the calibration-correction based on the attribute-value.

As a result of this method, all a user of this apparatus has to do is to put the calibration-correction apparatus into the turbidity measurement apparatus. After that, the calibration—including corrections, maintenance statements, alarms, etc.—is then performed automatically.

In various embodiments, the method further comprises the steps of:
Before determining the combination-value, sending, by means of a communicator, an identity value of the calibration-correction apparatus from the calibration-correction apparatus to the turbidity measurement apparatus; and
Before storing the attribute-value, sending, by means of a communicator, the attribute-value from the turbidity measurement apparatus to the calibration-correction apparatus.

In these embodiments, most of the computing steps are performed on the turbidity measurement apparatus. This embodiment may enhance the building of the combination-value. It may further enhance the use of communication and/or service capabilities of the measurement apparatus.

In various embodiments, the method further comprises the steps of:
before determining the combination-value, sending, by means of a communicator, an identity value of the turbidity measurement apparatus from the turbidity measurement apparatus to the calibration-correction apparatus; and before storing the attribute-value, sending, by means of a communicator, the attribute-value from the turbidity measurement apparatus to the calibration-correction apparatus.

In these embodiments, most of the computing steps are performed on the calibration-correction apparatus. This embodiment may improve the utilization rate of the calibration-correction apparatus and keep all relevant values locally, i.e., on the calibration-correction apparatus. This may further improve some security aspects.

In various embodiments, the method further comprises the step of:

Before the measuring, calibrating the measurement apparatus with a primary turbidity calibration standard.

The primary turbidity standard may be or comprise a Formazine solution. This step may enhance the precision of the measurements.

In various embodiments, the attribute-value is a value-pair representing a relation between the turbidity calibration standard and the turbidity measurement apparatus.

In various embodiments, the attribute-value further comprises at least one of the following:

a serial number, a nominal turbidity value, and a manufacturing date of the calibration standard, and/or a serial number, a last-calibration value, a minimum-calibration value, a maximum-calibration value, a last-calibration date, and a correction-data of the measurement apparatus.

Correction-data may comprise, e.g., a slope and offset of a last calibration. These values may contribute to an identification, for a more precise computing of the correction-value, for providing data, e.g., for service and maintenance, for forecasting a maintenance or correction, for informing a user about unexpected variations, which may be a sign of a damage, theft protection, and/or other purposes.

In various embodiments, the reading the attribute-value from the memory is performed by using a communicator. The communicator on the side of the calibration-correction apparatus may have its counterpart on the side of the turbidity measurement apparatus.

A further aspect comprises a use of a turbidity calibration-correction apparatus as described above and/or below and/or a method as described above and/or below for an automated calibration-correction turbidity calibration of a turbidity measurement apparatus.

A further aspect comprises a computer program product comprising instructions, which, when the program is executed by a computer, cause the computer to carry out the method as described above and/or below.

A further aspect comprises a computer-readable storage medium where a computer program as described above is stored on.

In FIG. 1, a turbidity calibration-correction apparatus 10 according to an embodiment is depicted schematically. The calibration-correction apparatus 10 comprises a turbidity calibration standard 20. The turbidity calibration standard 20 is configured to provide a measured turbidity value, when being measured by one of the turbidity measurement apparatuses 50, 51, and/or 52. The turbidity calibration standard 20 may be a solid, a gel, or a fluid. The turbidity measurement may be performed by sending light through window 45 of the housing 40 to the calibration standard 20 and measuring the scattered light, e.g., at an angle of 90° from the light-beam through another window (not shown) of the housing 40.

The calibration standard 20 may have a nominal value, possibly measured right after manufacturing. When measuring the calibration-correction apparatus 10 by means of measurement apparatuses 50, 51, and/or 52, the measured values may differ among the measurement apparatuses 50, 51, 52, respectively, and may also differ from the nominal value.

After measuring the calibration standard 20, the measured values may be used to compute a correction-value, as a function of the measured turbidity value. The computation may be performed on the calibration-correction apparatus 10 and/or on the measurement apparatus 50, 51, and/or 52, which has performed the measuring. The correction-value may then be stored on a memory 30, which is arranged inside the housing 40. The correction-value may be stored as an attribute-value of a combination-value of the calibration-correction apparatus 10 and the turbidity measurement apparatus 50, 51, 52. For the combination-value, the identities of the calibration-correction apparatus 10 and of the measurement apparatus 50, 51, 52—e.g., their serial numbers—may be used. The identity of the measurement apparatus 50, 51, 52 may be acquired by means of a communicator 35 (and its counterpart in measurement apparatus 50, 51, 52). For the calibration, the turbidity calibration-correction apparatus 10 may then be measured by the respective measurement apparatus 50, 51, 52 and the stored correction-value may be used for the automated calibration-correction. For an easy and automated handling, it may be useful that the memory 30 and/or the communicator 35 are an integral part of the calibration-correction apparatus 10, thus avoiding to confuse calibration standard 20 with a different one.

Figure 2:
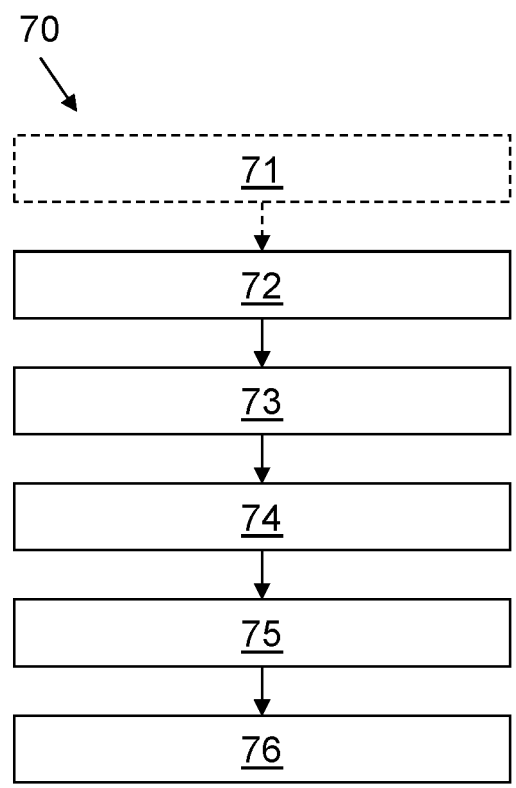
FIG. 2 depicts schematically a method according to an embodiment.

FIG. 2 depicts schematically a flow-diagram 70 of a method for an automated calibration-correction of a turbidity calibration-correction apparatus 10 according to an embodiment. In an optional step 71, a turbidity measurement apparatus 50 (see FIG. 1) is calibrated with a primary turbidity calibration standard, e.g., with Formazine. This optional step 71 improves the precision of the measurement results. In a step 72, a turbidity value of a calibration standard 20 is measured, by means of a turbidity measurement apparatus 50. In a step 73, an attribute-value is determined, wherein the attribute-value at least comprises a correction-value that is a function of the measured turbidity value. In a step 74, at least an identity of the turbidity measurement apparatus and the correction-value from the turbidity measurement apparatus is transferred, by means of a communicator, to the calibration-correction apparatus. In a step 75, the attribute-value is stored in a memory 30. In a step 76, the calibrating, along with the automated calibration-correction of the turbidity calibration-correction apparatus 10, is performed. For this, the attribute-value from the memory 30 is read and, based on the attribute-value (comprising, among others, the correction-value), the calibration-correction is done. This method may be conducted in a highly automated way.

Figure 3:
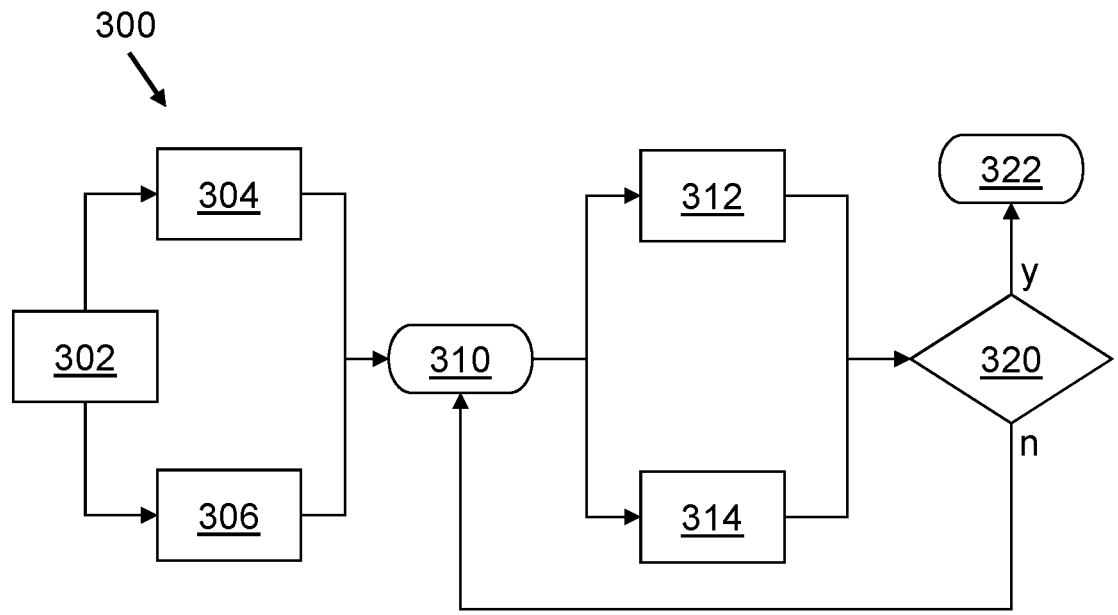
FIG. 3 depicts a diagram that sketches some steps for assigning a first relation-value to a turbidity calibration standard according to an embodiment.
Figure 4:
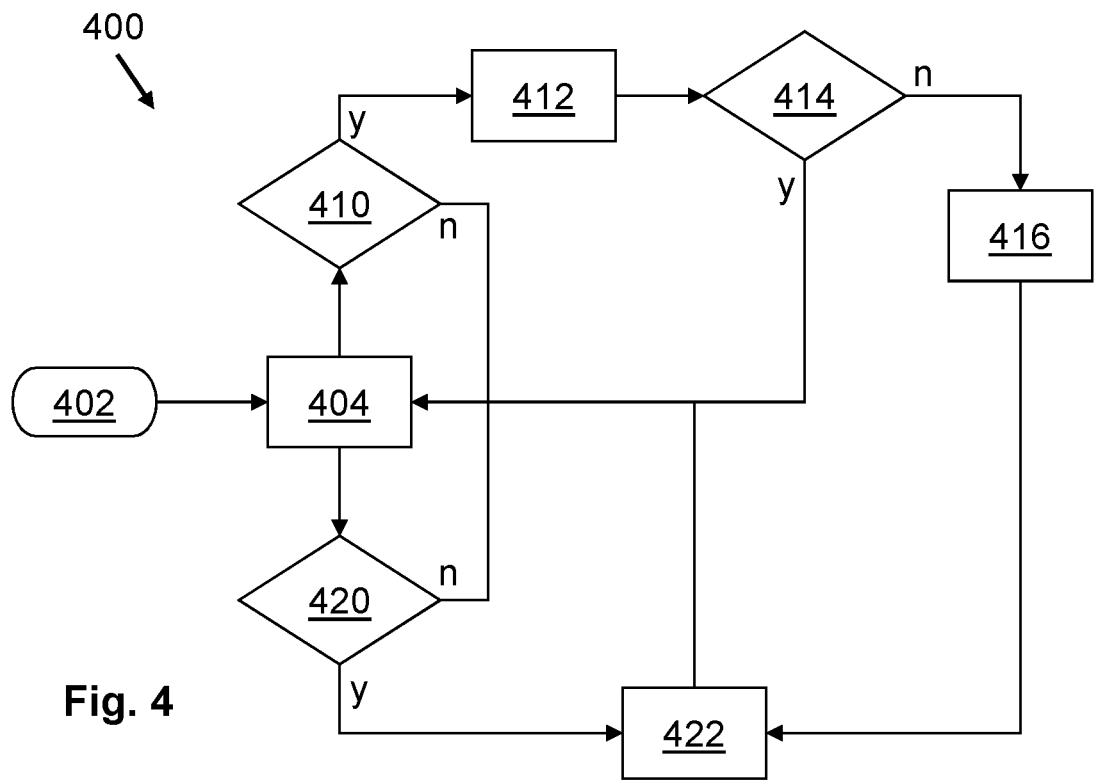
FIG. 4 depicts schematically an example of an automatic calibration process using a calibration-correction apparatus according to an embodiment.

FIG. 3 depicts a diagram 300 that sketches some steps that are taken when assigning a first relation-value to a turbidity calibration standard according to an embodiment. In a step 302, a so-called "primary standard" is used for calibrating a reference turbidity measurement apparatus 50 (see FIG. 1 or 5), sometimes called "golden instrument". The "primary standard" may be Formazine, e.g., raw Formazine of 4000 NTU. In a step 304 or 306, respectively, a turbidity calibration-correction apparatus 10, comprising a primary turbidity calibration standard, is placed in the measurement apparatus 50. Step 304 may differ from step 306—and/or from other steps—by the turbidity value of the primary turbidity calibration standard. For instance, in the step 304 a primary turbidity calibration standard with a value of 40 NTU may be used, and in the step 306 a primary turbidity calibration standard with a value of 10 NTU may be used. In a step 310, the calibration of the turbidity calibration standards 20 is started. In a step 312, a "low range" turbidity calibration standard 20, is placed in the "golden instrument", i.e., inserted into measurement apparatus 50. In a step 314, a "high range" turbidity calibration standard 20, is placed therein. For instance, the "low range" turbidity calibration standard 20 may have a "nominal value" of 40 NTU, the "high range" turbidity calibration standard 20 may have a "nominal value" of 10 NTU. In a step 320, the "golden instrument" 50 determines if each of the turbidity calibration standards 20 fulfils a predefined accuracy requirement, e.g., within a tolerance range of less than 5%, less than 2%, or less than 1%. If this accuracy requirement is fulfilled, in a step 322 an attribute-value is stored in a memory 30 of the calibration-correction apparatus 10. The attribute-value comprises at least a correction-value that is a function of a turbidity value of the turbidity calibration standard 20 measured by said turbidity measurement apparatus 50, i.e., by the "golden instrument". Thus, the attribute-value may comprise a value-pair v=<v1, v2> representing a relation between the turbidity calibration standard 20 and the turbidity measurement apparatus 50, 51, 52. Value v1 may be called a first relation-value comprising values of the turbidity calibration standard 20. Value v2 may be called a second relation-value comprising values of the turbidity measurement apparatus 50, 51, 52. The turbidity calibration standard (s) 20 measured—and/or "validated"—this way may, then, be used in further turbidity measurement apparatuses 51, 52. These further turbidity measurement apparatuses 51, 52 may be calibrated, for instance by using steps 310 to 322 on the related measurement apparatus 51 or 52. Consequently, each of the measurement apparatuses 50, 51, 52 is run with a highly precise—and precisely adapted—turbidity calibration standard 20, when conducting productive measurements. These apparatuses 51, 52 may, for instance, use an automatic calibration process 400 as shown in FIG. 4.

Additionally or as an alternative, there is also a possibility of upgrading to the features described above and/or below. If, for instance, a user has a turbidity measurement apparatus without "automatic calibration", upgrading may be performed this way:

Attach an existing turbidity calibration standard 20 to a "hollow" turbidity calibration-correction apparatus 10.
Perform a primary calibration of the turbidity measurement apparatus 50, 51, 52.
Move the "upgraded" turbidity calibration-correction apparatus 10 into the optical path of the flow cell 58.
Write a respective value-pair v=<v1, v2> into the memory 30 of the "upgraded" turbidity calibration standard 10.

This information can then be used for automatic and/or manual calibration as described above and/or below.

FIG. 4 depicts schematically an example of an automatic calibration process 400 using a calibration-correction apparatus 10 according to an embodiment. For this process 400, the calibration-correction apparatus 10 may have a value-pair v=<v1, v2> in the memory 30 of each turbidity calibration standard that is used.

In an initial step 402, at least one of the turbidity measurement apparatuses 50, 51, 52 is installed in a plant. In a step 404, productive measurements are performed. When, in a step 410, the machine determines that a first time-span is excessed, an automatic calibration verification is performed in a step 412. If not, productive measurements are continued in the step 404. In the step 412, the turbidity measurement apparatus 50, 51, 52 may use the calibration-correction apparatus 10. Step 414 determines if the calibration verification meets predefined requirements. If the requirements are fulfilled, productive measurements are continued in the step 404. If not, an alarm is set in a step 416. The alarm may trigger a calibration that uses Formazine, in a step 422. When, in a step 420, the machine determines that a second time-span is excessed, an automatic calibration verification using Formazine is performed in the step 422. If not, productive measurements are continued in the step 404.

Figure 5:
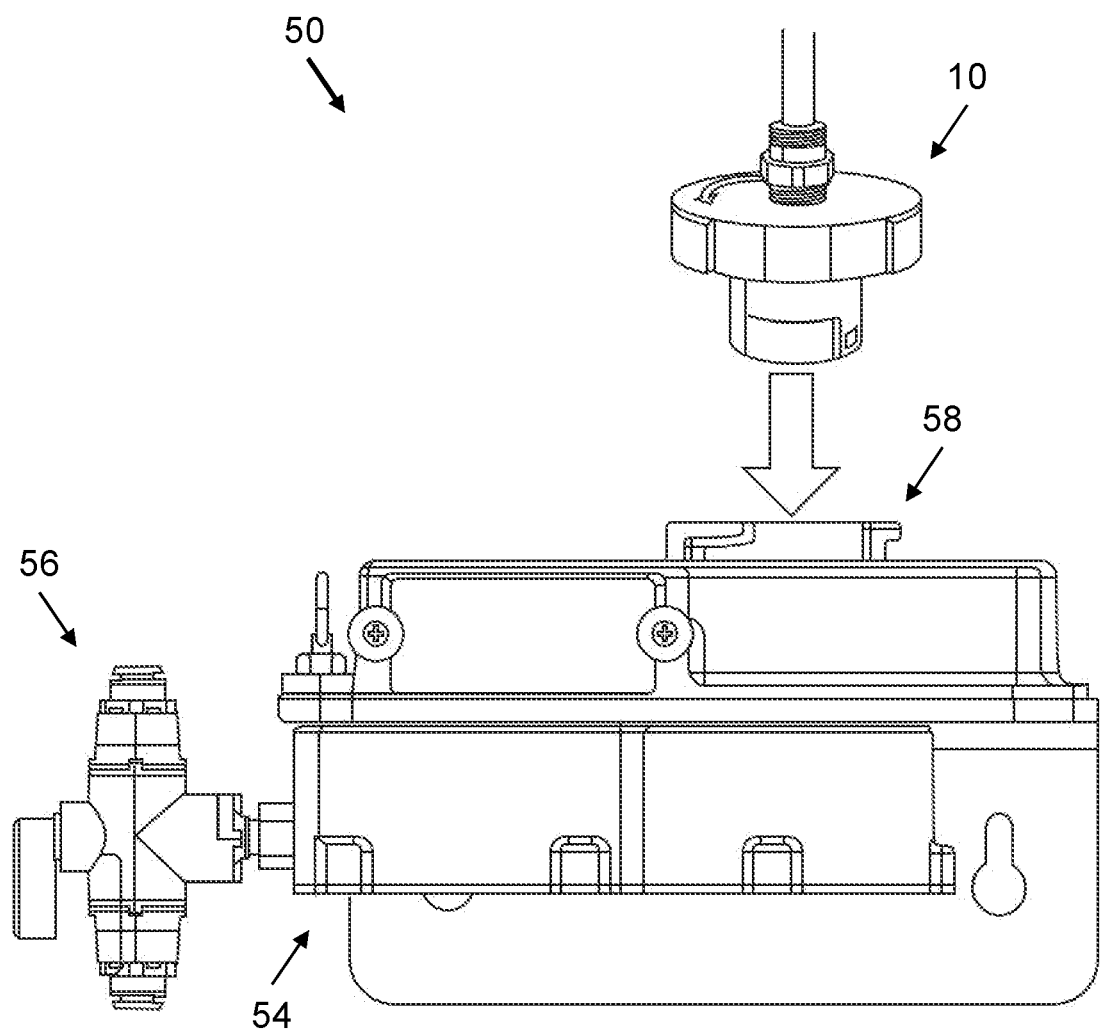
FIG. 5 depicts schematically a turbidity measurement apparatus according to an embodiment.

FIG. 5 depicts schematically a turbidity measurement apparatus 50, 51, 52 according to an embodiment. For productive measurements, a medium to be measured is led into a medium passage 56 and forwarded to a measurement core 54 within the measurement apparatus 50, 51, 52. For calibration, a turbidity calibration-correction apparatus 10 may be inserted into a turbidimeter flow cell 52. The turbidity calibration-correction apparatus 10 may have a value-pair v=<v1, v2> in its memory 30.

The turbidity measurement apparatus 50, 51, 52 of FIG. 5 may also be used for "manual" calibration, additionally or as an alternative to the automatic calibration process 400 as shown in FIG. 4. In such a scenario, a user may only wish to purchase one single turbidity calibration-correction apparatus 10, and may want to use this standard on multiple turbidity measurement apparatuses 50, 51, 52. The first time the user uses the turbidity calibration-correction apparatus 10 on a turbidimeter 50, 51, 52, the user would need to perform its specific instrument calibration following steps:

Perform a primary standard calibration, similar to steps 302 to 306 (see FIG. 3).
Place the turbidity calibration-correction apparatus 10 within the flow cell 58.
Assign the turbidity calibration-correction apparatus 10 with a value-pair v=<v1, v2> in its memory 30.

The memory 30 would then store this information for as many turbidimeters 50, 51, 52 that it has been used with. This advantageously may eliminate issues with transferability between different turbidimeters, as each unit has this value pair, which is configured to be used for future calibrations.

Additionally or as an alternative, there may be a value pair for a "wet" calibration with the solid standard, and for a "dry" calibration with the solid standard. For instance, if a user wants to use a solid turbidity calibration-correction apparatus 10, they have a choice, it may be possible to drain the flow cell and ensure it is dry and clean, or to place the standard into the flow cell with the sample still there. Due to the optical design, the standard will have different values in the "wet" and "dry" settings, e.g., due to different reflectance's between media of different refractive indexes. Using the memory 30, e.g., implemented as an RFID, the value in the "wet" setting and in the "dry" setting could be assigned to the standards. Thus, users may have a choice in whatever they find easiest.

While one or more exemplary embodiments of the present disclosure have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present disclosure covers further embodiments with any combination of features from different embodiments described above and below. Additionally, statements made herein characterizing the disclosure refer to an embodiment of the disclosure and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 10 turbidity calibration-correction apparatus
20 turbidity calibration standard
30 memory
35 communicator
40 housing
45 window
50, 51, 52 turbidity measurement apparatus
70 flow-diagram
71-76 steps

The invention claimed is:

1. A turbidity calibration-correction apparatus configured for an automated calibration-correction of a turbidity, the turbidity calibration-correction apparatus comprising:
    a turbidity calibration standard configured for calibration of a turbidity measurement apparatus;
    a communicator configured to transfer at least an identity of the turbidity measurement apparatus and a correction-value from the turbidity measurement apparatus to the turbidity calibration-correction apparatus; and
    a memory configured to store an attribute-value comprising at least the correction-value that is a function of a turbidity value of the turbidity calibration standard measured by the turbidity measurement apparatus, wherein the automated calibration-correction is based on the correction-value,
    wherein the attribute-value is a value-pair representing a relation between the turbidity calibration standard as a first relation-value and the turbidity measurement apparatus as a second relation-value, and wherein the attribute-value further comprises at least one of: a last-calibration value, a minimum-calibration value, a maximum-calibration value, a last-calibration date, and a correction-data of the turbidity measurement apparatus.

2. The turbidity calibration-correction apparatus of claim 1,
    wherein the turbidity calibration standard is a solid, a gel, a fluid, and/or a glass-ceramic of a lithium, silicon, and aluminum (LAS) system, and/or an inorganic, non-porous Lithium Aluminium Silicon oxide glass-ceramic.

3. The turbidity calibration-correction apparatus of claim 1,
    wherein the communicator is configured to support an RFID-based protocol.

4. The turbidity calibration-correction apparatus of claim 3, wherein the RFID-based protocol comprises at least one member of a group consisting of an NFC protocol, a Bluetooth protocol, and a proprietary protocol.

5. The turbidity calibration-correction apparatus of claim 1, wherein the correction-value is stored in a data structure in the memory as the attribute-value, the data structure being a pointer to an area in the memory, and wherein the correction value includes an identity of the turbidity calibration-correction apparatus and the identity of the turbidity measurement apparatus.

6. A turbidity measurement apparatus, comprising a communicator and configured to transfer at least an identity of the turbidity measurement apparatus and a correction-value from the turbidity measurement apparatus to a turbidity calibration-correction apparatus, wherein an attribute-value comprising at least the correction-value is a function of a turbidity value of a turbidity calibration standard measured by the turbidity measurement apparatus, wherein the attribute-value is a value-pair representing a relation between the turbidity calibration standard as a first relation-value and the turbidity measurement apparatus as a second relation-value, and wherein the attribute-value further comprises at least one of: a last-calibration value, a minimum-calibration value, a maximum-calibration value, a last-calibration date, and a correction-data of the turbidity measurement apparatus.

7. A method for an automated calibration-correction of a turbidity of a turbidity measurement apparatus, the method comprising:
    measuring, by means of the turbidity measurement apparatus, a turbidity value of a calibration standard of a calibration-correction apparatus;
    determining an attribute-value, wherein the attribute-value comprises at least a correction-value that is a function of the measured turbidity value;
    storing the attribute-value in a memory of the calibration-correction apparatus; and
    when calibrating the turbidity measurement apparatus with the calibration standard, reading, by the calibration-correction apparatus, the attribute-value from the memory and performing the automated calibration-correction based on the attribute-value, wherein the attribute-value is a value-pair representing a relation between the turbidity calibration standard as a first relation-value and the turbidity measurement apparatus as a second relation-value, and wherein the attribute-value further comprises at least one of: a last-calibration value, a minimum-calibration value, a maximum-calibration value, a last-calibration date, and a correction-data of the turbidity measurement apparatus.

8. The method of claim 7, further comprising:
    before determining the combination-value, sending, by means of a communicator, an identity value of the calibration-correction apparatus from the calibration-correction apparatus to the turbidity measurement apparatus; and
    before storing the attribute-value, sending, by means of the communicator, the attribute-value from the turbidity measurement apparatus to the calibration-correction apparatus.

9. The method of claim 7, further comprising:
    before determining the combination-value, sending, by means of a communicator, an identity value of the turbidity measurement apparatus from the turbidity measurement apparatus to the calibration-correction apparatus; and before storing the attribute-value, sending, by means of the communicator, the attribute-value from the turbidity measurement apparatus to the calibration-correction apparatus.

10. The method of claim 7, further comprising:
before the measuring, calibrating the measurement apparatus with a primary turbidity calibration standard.

11. A computer program product comprising non-transitory computer executable instructions that, when the program product is executed by a processor of the turbidity measurement apparatus, and/or by a processor of the turbidity calibration-correction apparatus, causes the computer, the turbidity measurement apparatus, and/or by the turbidity calibration-correction apparatus, respectively, to carry out the method according to claim 7.

12. A non-transitory computer-readable storage medium that stores the computer program according to claim 11.

* * * * *